No. 613,738. Patented Nov. 8, 1898.
M. J. TODD.
HORSE HAY RAKE.
(Application filed Oct. 1, 1895.)
(No Model.) 6 Sheets—Sheet 1.
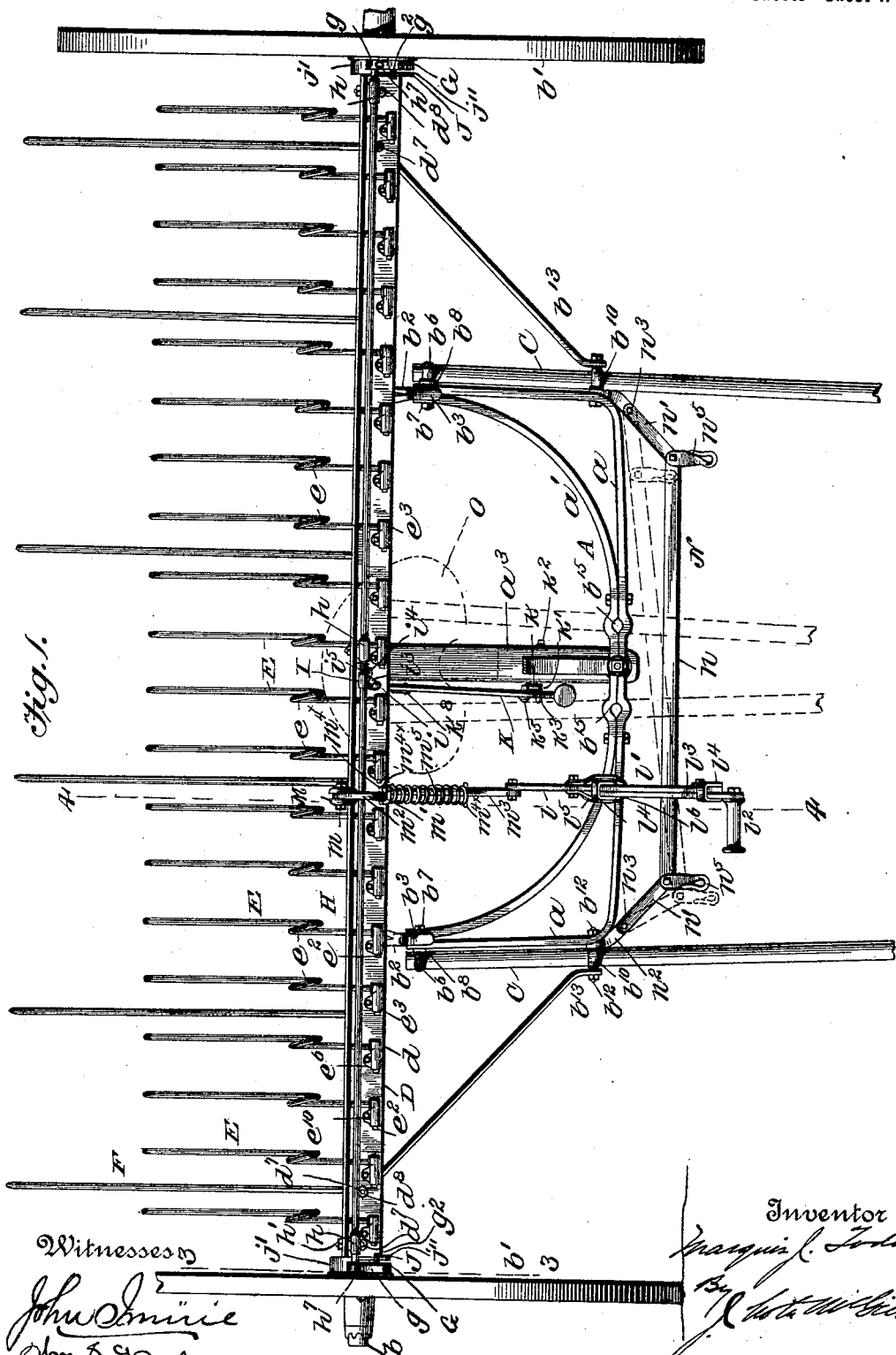
Witnesses
John Imrie
Wm. D. Dodges
Inventor
Marquis J. Todd,
By
Attorney

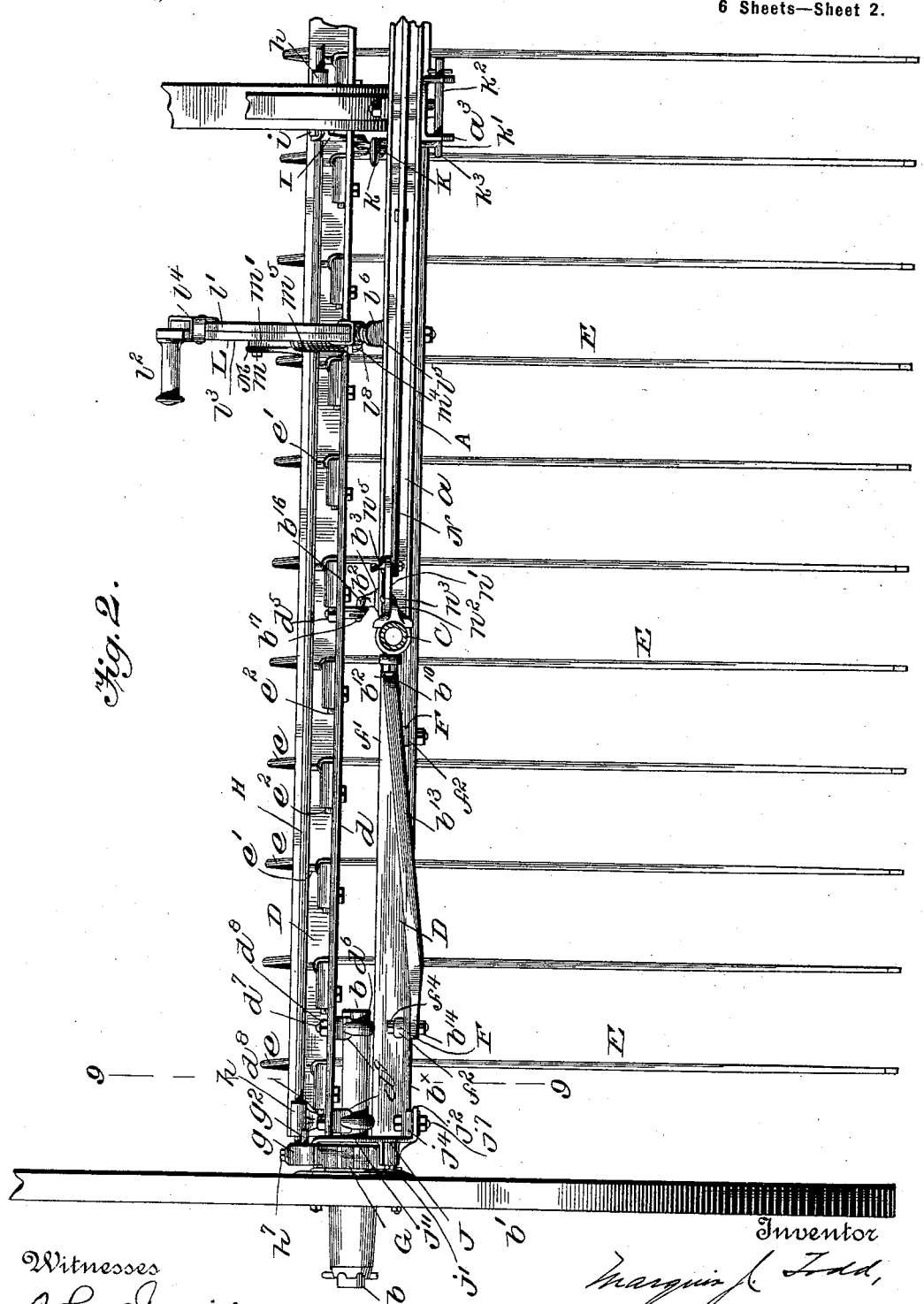

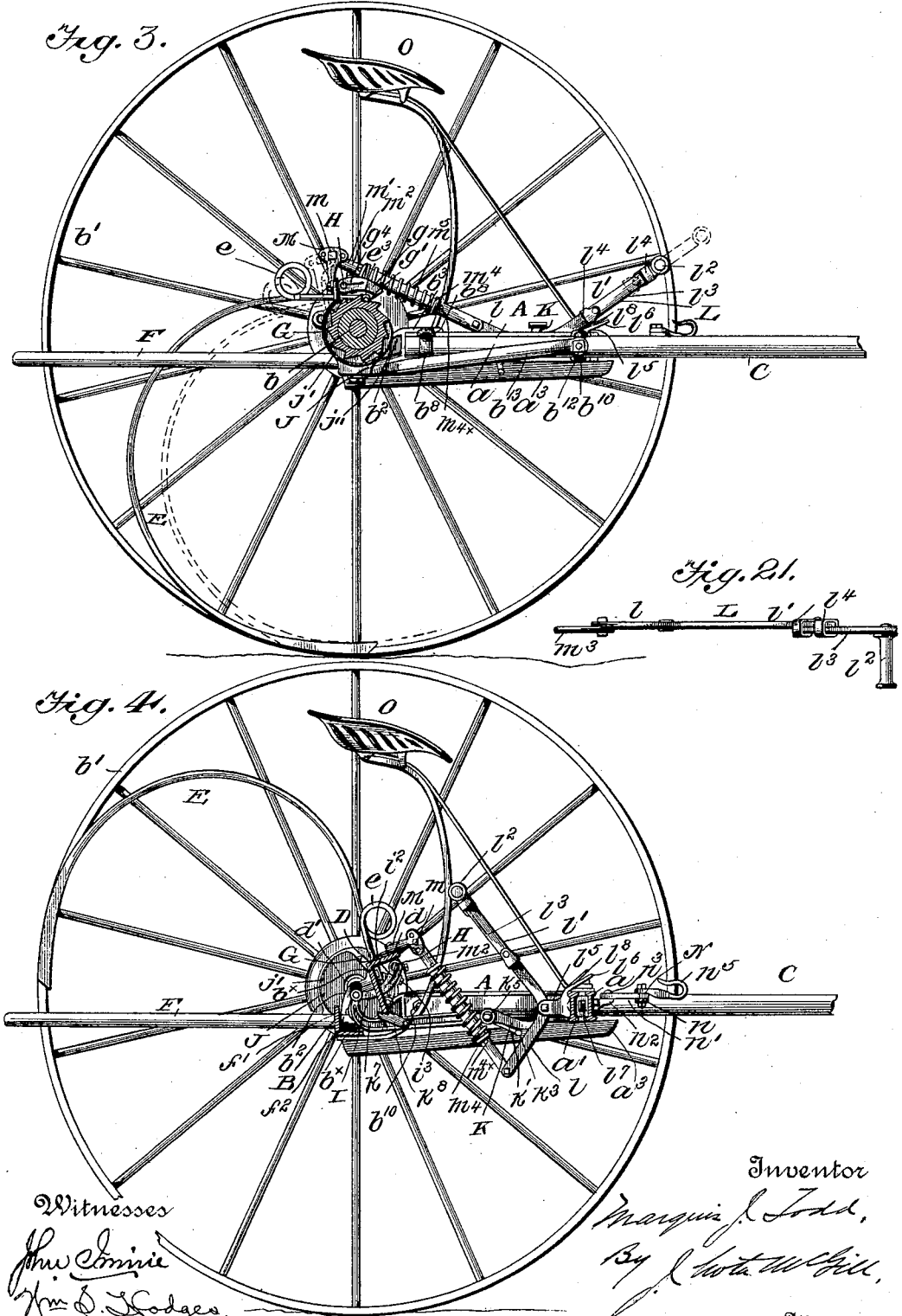

No. 613,738. Patented Nov. 8, 1898.
M. J. TODD.
HORSE HAY RAKE.
(Application filed Oct. 1, 1895.)
(No Model.) 6 Sheets—Sheet 4.
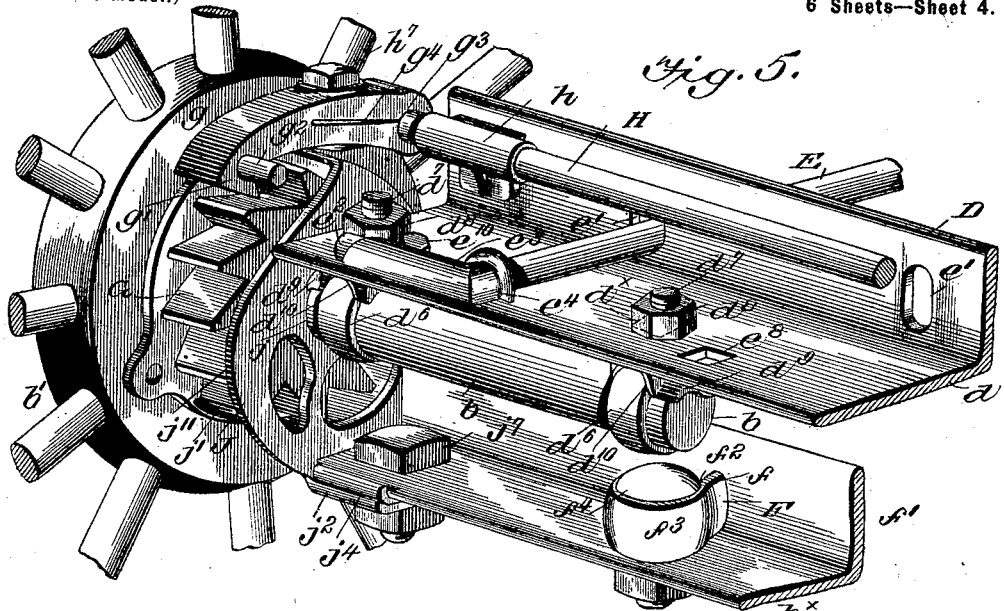
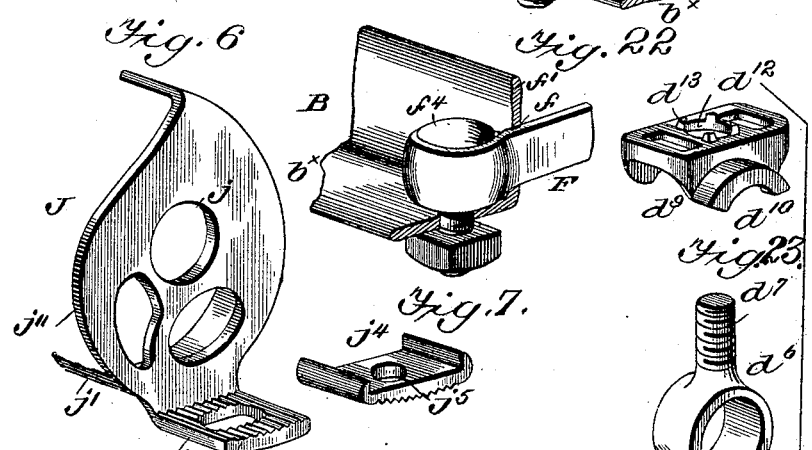
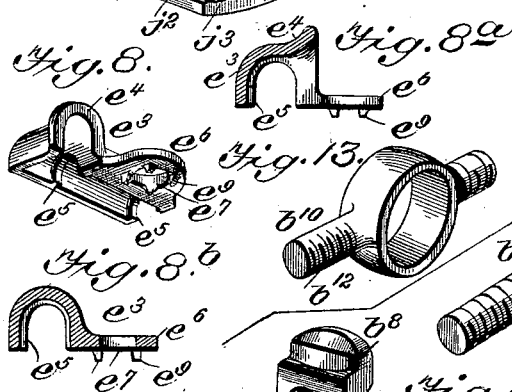
Witnesses
Inventor
Marquis J. Todd,
By his Attorney

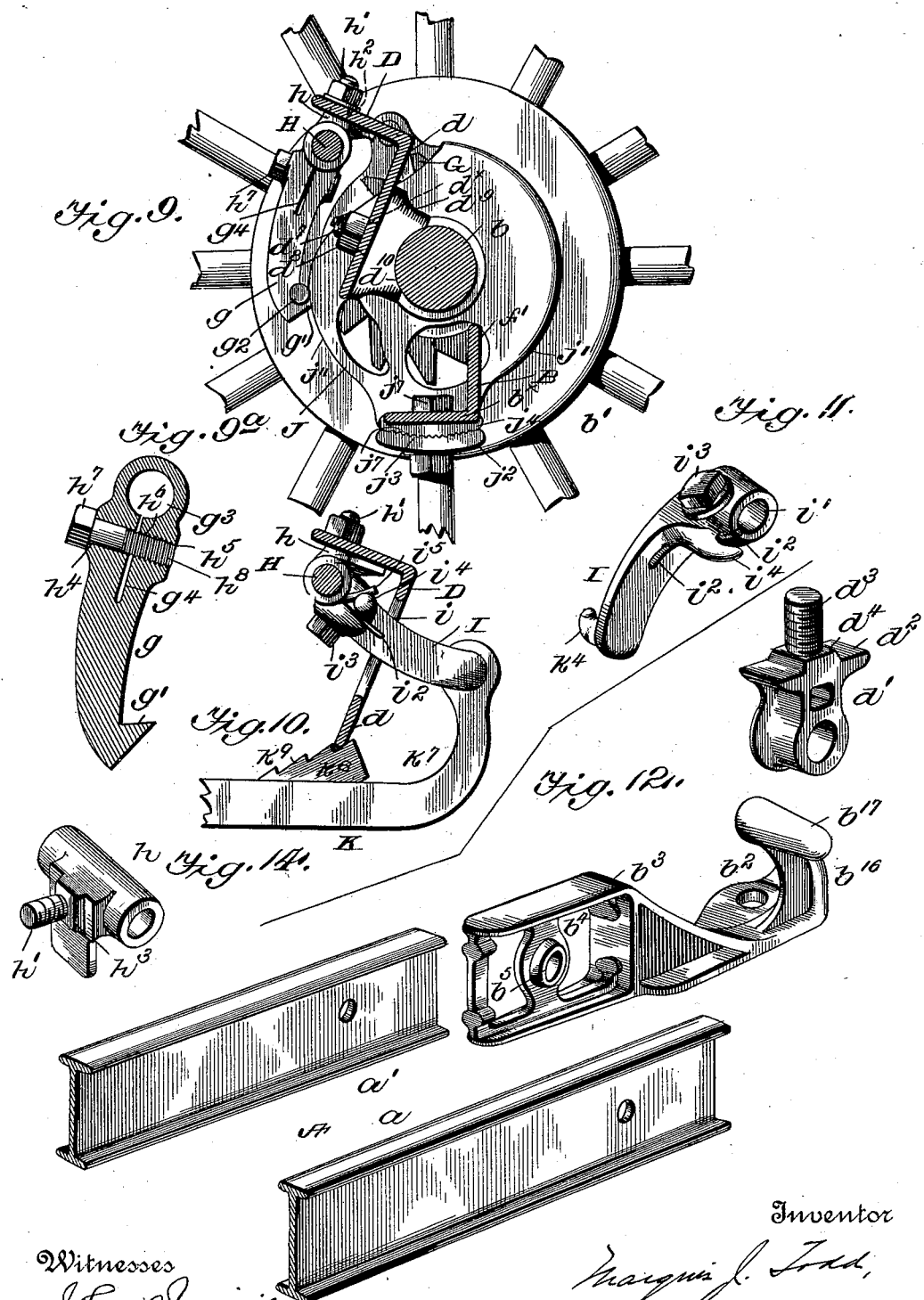

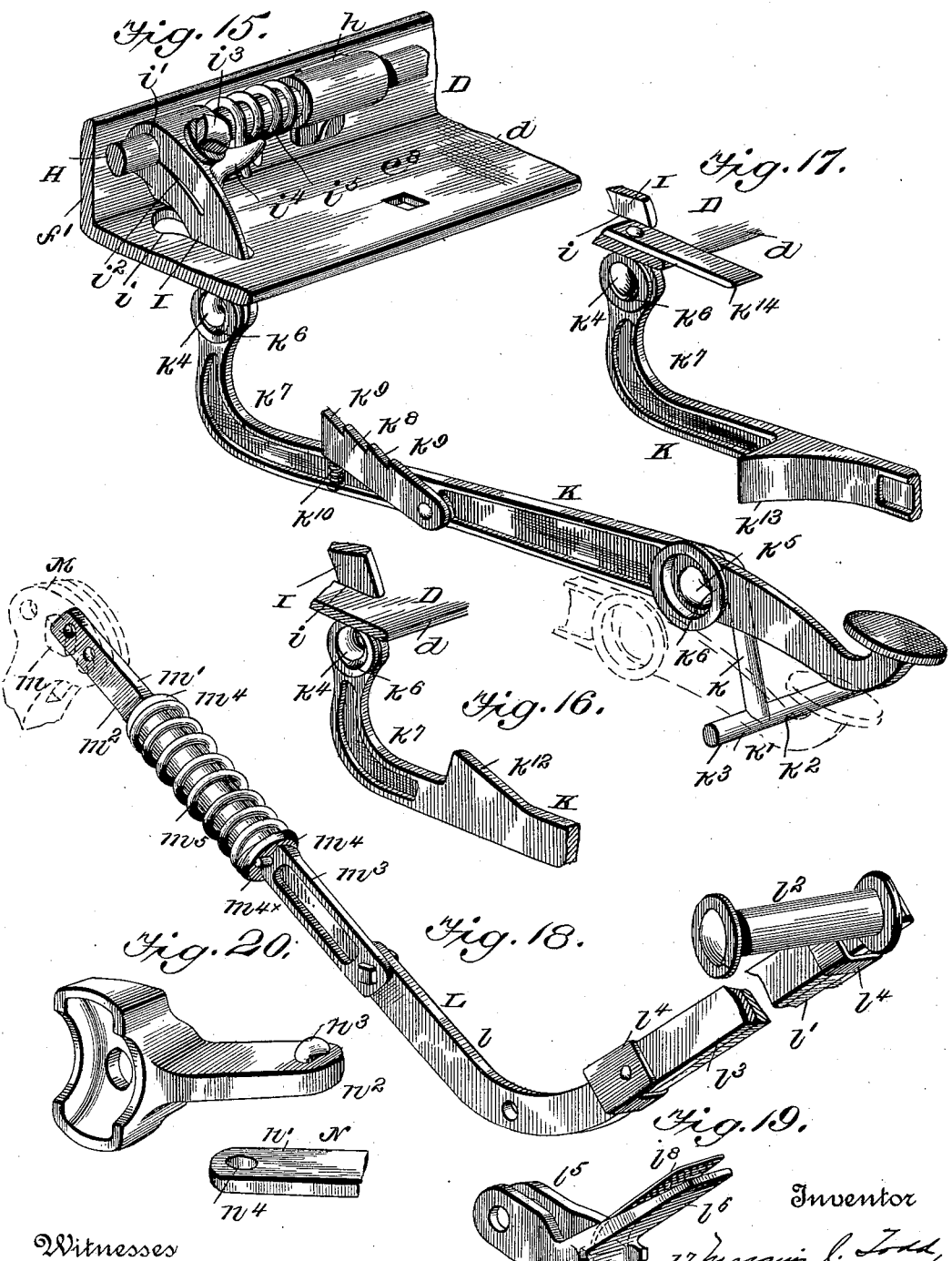

UNITED STATES PATENT OFFICE.

MARQUIS J. TODD, OF BUFFALO, NEW YORK, ASSIGNOR TO THE PITTS AGRICULTURAL WORKS, OF SAME PLACE.

HORSE HAY-RAKE.

SPECIFICATION forming part of Letters Patent No. 613,738, dated November 8, 1898.

Application filed October 1, 1895. Serial No. 564,313. (No model.)

*To all whom it may concern:*

Be it known that I, MARQUIS J. TODD, of Buffalo, in the county of Erie and State of New York, have invented certain new and useful Improvements in Horse Hay-Rakes; and I do hereby declare the following to be a full, clear, and exact description of the invention, such as will enable others skilled in the art to which it appertains to make and use the same.

This invention contemplates certain new and useful improvements in horse hay-rakes.

The objects of the invention are, first, to provide a rake of this character composed of a minimum number of parts; second, to dispense with a separate tooth-guide independent of the rake-head; third, to provide a combined hand and foot retaining-lever; fourth, to form an improved yielding flexible connection between the retaining-lever and the rake-head; fifth, to mount the rake-head directly above and in line with the clearer-head, so that any strain upon one will be exerted upon the other and the full strength of the clearer-head is utilized in supporting the rake-head; sixth, to simplify the construction of the draft-frame; seventh, to form improved connections between parts united by threaded bolts, whereby in some instances nuts on said bolts are rendered unnecessary and in other instances the bolts are held out of contact with the holes through which they project and parts are held as against moving out of position; eighth, to form improved means for disengaging the pawls of the trip-shaft from the ratchet of the carrying-wheels; ninth, to provide improved means for normally holding the connection between the retaining-lever and the rake-head out of a dead-center; tenth, to provide an improved trip-lever and means for connecting the same and limiting the movement thereof; eleventh, to enable the rake-head to be securely held when elevated, so as to prevent any downward movement thereof, and hence avoiding contact of the pawls with the ratchets while the rake is elevated; twelfth, to provide improved clips for attaching the rake-teeth to their head, and, thirteenth, to provide a draft-equalizer whereby the swinging of the rake from side to side is reduced to a minimum.

The invention will be hereinafter fully set forth, and particularly pointed out in the claims.

In the accompanying drawings, Figure 1 is a plan view of my improved rake. Fig. 2 is an enlarged front view showing but one-half of the rake. Fig. 3 is a sectional view on the line 3 3, Fig. 1, showing the rake lowered. Fig. 4 is a similar view on line 4 4, Fig. 1, with the rake elevated. Fig. 5 is an enlarged view in perspective with parts broken away, showing the pawl-and-ratchet mechanism and one of the connections between the rake and clearer heads and the axle. Fig. 6 is a detached view of one of the pawl-stops or throw-offs. Fig. 7 is a detail. Fig. 8 is a view of one of the rake-teeth clips. Figs. 8$^a$ and 8$^b$ are cross-sectional views thereof. Fig. 9 is an enlarged sectional view on the line 9 9, Fig. 2. Fig. 9$^a$ is a longitudinal sectional view of one of the pawls. Fig. 10 is a sectional detail view of a portion of the trip-lever and rake-head, showing the latter held elevated. Fig. 11 is a perspective view of the trip-arm. Fig. 12 shows one of the hinging-arms, the ends of the draft-frame bars, and one of the hinging-eyes, all detached. Fig. 13 is a view of one of the loop or eye bolts for uniting the frame-bars, shaft, and brace-rod. Fig. 14 is a view of one of the sleeves for supporting the trip-shaft. Fig. 15 is a view in perspective, showing the trip-lever and its connection to the trip-shaft. Figs. 16 and 17 are views of slight modifications. Fig. 18 is a view in perspective of the retaining-lever. Fig. 19 is a view of the fulcrum-support for the latter. Fig. 20 shows details. Fig. 21 is a plan view of the retaining-lever. Fig. 22 shows the connection of one of the clearer-sticks to its head. Fig. 23 shows one of the eyebolts for connecting the rake-head to the axles and also to the interposed clip. Fig. 24 shows the other form of eyebolt for connecting the ends of the draft-frame bars to the hinging-arms and uniting the shafts thereto.

Referring to the drawings, A designates the draft-frame, which consists of two cross-bars *a* and *a'*, one being of substantially U form and the other bent into a semicircle, (see Fig. 1,) said bars being secured at three points— their ends and center. Each of these bars is of I shape in cross-section, and at their centers they are connected to a center bar $a^3$.

B is the clearer-head, which is arranged transversely in rear of the draft-frame and at its ends is dependingly connected to short axles $b$, upon which are mounted the carrying-wheels $b'$. This clearer-head is composed of a right-angular or L bar, and to its lower horizontal portion $b^\times$ are connected two arms $b^2$, to which the ends of the bars of the draft-frame are attached. (See Fig. 12.) Each of these arms has a forward rectangular extension $b^3$ of skeleton-like form, having a central web $b^4$ and a hole $b^5$. The draft-frame bars at their ends are designed to fit snug in the recessed sides of these extensions and are firmly united thereto by loop or eye bolts $b^6$, having nuts $b^7$ and shouldered clips $b^8$. The shafts C are preferably of tubular form and their thill ends fit in said loops of these eyebolts and are firmly held by the interposed clips $b^8$, the engaging faces of which are concaved, so as to bear firm against the thills. They are also each additionally held by a forward eyebolt $b^{10}$, having two lateral threaded extensions $b^{12}$, (see Fig. 13,) one of which is nutted after being extended through openings in the bar $a$, while on the outer extension of each clip is secured one end of a brace-plate $b^{13}$, the rear ends of said latter plates being bolted to the portion $b^\times$ of the clearer-head at $b^{14}$. (See Figs. 1, 2, and 3.) By removing these eyebolts $b^6$ and $b^{10}$ and substituting ordinary nutted bolts therefor the two shafts can be located centrally of the draft-frame to form a tongue or pole, as shown in dotted lines, Fig. 1. For this purpose the bars $a$ $a'$ have crimped portions, forming holes $b^{15}$, through which, say, the eyebolts $b^6$ are passed, while the other eyebolts $b^{10}$ secure the ends of said shafts direct to the clearer-head. The arms $b^2$ have upturned extensions $b^{16}$, which terminate in rounded angular ends $b^{17}$, which form hinges for the rake-head.

D is the rake-head, (see Figs. 2 and 5,) arranged longitudinally over and running in line with the clearer-head, and at its ends is rigidly secured upon the short axles $b$. This rake-head, like the clearer-head, consists of a right-angular or L shape bar in cross-section. To its normally horizontal portion $d$ are connected two depending hinge-eyes $d'$, which engage with and form a pivotal connection on the rounded ends $b^{17}$ of the hinging-arms $b^2$. These hinge-eyes $d'$ have shoulders $d^2$ and upper threaded extensions $d^3$, the base of each of which is tapered, as at $d^4$, so that as the nuts $d^5$ are screwed home the hinge-eyes are firmly and securely held in place as against loosening or wabbling, and the threads are kept out of contact with the holes through which they are passed by the taper at $d^4$, the holes being angular and larger than the threaded extension. (See Fig. 12.) At each end the rake-head is connected to the short axles by means of two eyebolts $d^6$, (see Figs. 5 and 23,) the threaded portions $d^7$ of which are passed through angular holes $d^\times$ in the portion $d$ of the rake-head, and nuts $d^8$ are screwed thereon. In order to avoid contact between the several nutted bolts and the holes or openings in the rake-head through which they are passed and to prevent the interposed clips working loose, I make all of said holes angular and larger in diameter than the bolts. The object thereof can be illustrated at this point. A clip or seat $d^9$ is interposed between the rake-head and the eye of each of the bolts $d^6$. This clip is curved on its lower surface, as at $d^{10}$, to conform to the axle, and in its center is a hole $d^{12}$, which is designed to coincide with the angular hole in the rake-head. Around this hole $d^{12}$ on the upper face of the clip are a series of tapered lugs or projections $d^{13}$, which extend up into and contact with the sides of the angular hole, thereby insuring the firm seating of the clip when the nut is screwed home and preventing any wabbling thereof, at the same time avoiding any contact between the bolt and the rake-head. The same result is obtained in the case of the hinge-eyes $d'$, which have each a tapered base, as before stated. As will hereinafter be briefly noted, this is observed throughout the construction of the rake. As above stated, the rake-head is thus firmly secured at its ends to the short axles and at two intermediate points is hinged to the clearer-head.

E represents the rake-teeth, which are pivotally attached at their upper ends to the rake-head, and immediately in rear of the latter each of said teeth may be formed with a coil $e$. In advance of these coils the teeth are passed through oblong or oval slots $e'$ in the normally vertical portion of the L-bar, forming the rake-head, and their extreme ends are bent at right angles, as at $e^2$, and loosely but firmly held by clip $e^3$ to the normally horizontal portion of said head. Each of these clips (see Figs. 8, 8$^a$, and 8$^b$) is of semitubular form, left open at its ends, the opening $e^4$ being at right angles to the body of the clip and slightly flared to allow of the movement of the rake-teeth. This accommodates and incloses the right-angular end of each rake-tooth. On the inner surface of the tubular portion of each clip are two curved ridges $e^5$, which form the bearings or contact-points for the teeth, reducing friction to a minimum and binding the teeth without allowing any lateral motion of the secured ends thereof. From each clip extends a lateral flange $e^6$, having a circular hole $e^7$, which is coincident with one of a series of angular holes $e^8$ in the rake-head. Surrounding this hole $e^7$ and extending from the under side of the flange $e^6$ are tapered lugs or projections $e^9$, which fit snug within the hole $e^8$. The nutted bolt $e^{10}$ firmly holds the tooth-clip to the rake-head, and thereby securely fastens the tooth thereto. As in the instances before enumerated, the bolt does not engage the rake-head, but passes directly through the hole $e^7$ and the angular hole $e^8$ without contact with the latter. Thus are all the rake-teeth firmly attached to the rake-head, and being passed through the oblong slots in the vertical portion of said rake-head their movements are limited the same as if extended through a rider-bar. Hence to all practical purposes I combine the rake-head and rider-bar in one and dispense with an independent rider-bar for the teeth.

F designates the clearer-sticks, which are rigidly secured to the clearer-head and project rearwardly between the rake-teeth, occupying an approximately horizontal position in line with the draft-frame. Each stick is preferably flat and is passed through a snug-fitting hole $f$ in the vertical portion $f'$ of the clearer-head, its forward end $f^2$ having an eye $f^3$, through which and a coincident opening in the horizontal portion $b^×$ of the clearer-head is passed a nutted bolt $f^4$. In this way the clearer-sticks are rigidly attached to the clearer-head, and all wabbling thereof is prevented by the vertical portion of said head, through which the sticks are passed.

G designates ratchet-wheels secured to the inner sides of hubs of the carrying-wheels $b'$ by any suitable means, and $g$ pawls whereby the ratchet-wheels and rake-head are locked together for the purpose of dumping hay. Each of these pawls is provided on its front end with a hook $g'$, which engages with the teeth of one of the ratchet-wheels, and from said hook extends a lateral lug $g^2$. The opposite end of each pawl is provided with a hole or socket $g^3$ and also with a split $g^4$, extending longitudinally of the pawl a short distance and opening at one end into the socket.

H is the rock or trip shaft whereby the pawls are thrown into engagement with the ratchet-wheels. This trip-shaft extends longitudinally of the rake-head and is journaled to the vertical portion thereof at its center and ends by three sleeves $h$, each of which has a nutted threaded portion $h'$, which extends through an angular hole $h^2$ in said portion of the rake-head, a tapered base $h^3$ at the inner end of said threaded portion fitting and binding in said hole, holding the thread out of contact therewith. The ends of the trip-shaft fit in the sockets of the pawls $g$. In the split portions of each pawl are formed coincident holes $h^4$ $h^5$, the latter being threaded, as at $h^6$. A headed bolt $h^7$, having a threaded end $h^8$, is inserted into these holes, and the thread on the end thereof engages the threaded hole $h^5$, the split portion being drawn so as to firmly bind the pawl on the trip-shaft. In this way no nut on the bolt is required.

I represents a depending trip-arm (see Fig. 15) whereby the trip-shaft may be operated. It is secured centrally on the shaft and extends downward through a slot $i$ in the horizontal portion $d$ of the rake-head, which slot limits the movement thereof. It has a socket $i'$, through which the shaft is passed, and a longitudinal split $i^2$, a bolt $i^3$, having a thread on its end, engaging the threaded hole of the two coincident holes in said arm, enabling the latter to be securely fastened on the shaft in the same way as the pawls. From this arm projects a lateral lug or finger $i^4$, with which is designed to engage one end of a coil-spring $i^5$, which encircles the trip-shaft, the other end of said spring bearing against the vertical portion of the rake-head. This spring serves to normally keep the pawls out of engagement with the ratchet-wheels.

J designates stops or throw-offs for the pawls for disengaging the latter from the ratchet-wheels. (See Fig. 6.) They also form guards for the ratchet-wheels and connections between the clearer-head and axles. They consist each of a plate having a central hole $j$, through which one of the axles is passed, and an outwardly-extending curved guard $j'$, which extends over and protects part of the adjacent ratchet-wheel. Those portions of each plate between the ends of the curved guards are curved or bulged outwardly, as at $j'$, eccentrically to the axles to form throw-off cams, with which the lateral lugs $g^2$ of the pawls $g$ are designed to engage while the load is being dumped and gradually and easily lifted out of engagement with the ratchet-wheels. This engagement being gradual and complete the pawls are held entirely free from the ratchet-wheels. From the lower portion of each plate extends inwardly a slotted flange $j^2$, having an upper serrated face $j^3$, with which is designed to contact a correspondingly-serrated washer $j^4$, having a central hole $j^5$, through which a nutted bolt $j^7$ is passed for connecting said plates to the ends of the clearer-head. In this way the plates can be adjusted to regulate the point at which the pawls will be disengaged from the ratchet-wheels, and consequently controlling the extent of the throw of the rake-teeth and regulating the dumping—that is, providing for "quick" or "slow" action.

K is the trip-lever, provided with a foot or heel rest and by which the pawls are thrown into engagement with the ratchet-wheels. This trip-lever is fulcrumed on one arm $k$ of a bell-crank lever $k$, supported by the central bar $a^3$ of the draft-frame through an opening in which the horizontal arm $k^2$ of said bell-crank lever is passed. Said arm is extended at $k^3$ to form a stop for the trip-lever. At its rear end this lever K is connected to the lower end of the trip-arm beneath the horizontal portion of the rake-head. A lateral curved hook $k^4$ of the trip-arm and a similar hook $k^5$ of the bell-crank lever project through holes formed in the trip-lever and engage countersunk circular recesses $k^6$. In this way the trip-lever is firmly connected at its two points without the use of any bolts or nuts and after once being positioned cannot be removed save by the turning thereof on one side. Upon depressing the trip-lever it will move rearward and draw down the trip-arm, causing a partial rotation of the trip-shaft as against the action of the spring $i^5$, thus throwing the pawls into engagement with the ratchet-wheels, whereby the rake-head is caused to revolve with the carrying-wheels and elevate the rake-teeth for dumping the load. As the rake-head is approaching the limit of its movement the lateral projections of the pawls engage the cam-like edges of the throw-offs J, thereby disengaging the pawls from the ratchet-wheels and permitting the latter to revolve without contacting with said pawls. This trip-lever is curved or bowed at its inner end $k^7$ and is provided at a point about on a line with the circle or semicircle described by the rake-head when being raised with a shoulder or shoulders, which as long as the trip-lever is held rearward will contact with and aid in holding said rake-head elevated. This may be accomplished in various ways—as, for instance, a plate $k^8$, pivoted to the trip-lever and having a series of shoulders $k^9$ on its upper edge. This plate is normally held elevated by a coil-spring $k^{10}$, (see Fig. 15,) or a curved shoulder $k^{12}$ may be formed with the upper edge of the lever, (see Fig. 16,) or a similar shoulder $k^{13}$ may extend from one side of the lever, (see Fig. 17,) so as to be engaged by a short arm $k^{14}$, extending from the normally horizontal portion of the rake-head. In this way the rake-head is firmly held while elevated as against the tendency to fall rearward while the trip-lever is depressed, whereby the pawls are prevented from intermittently engaging the teeth of the ratchet-wheels. The downward movement of the trip-lever is limited by the stop or extension $k^3$ of the bell-crank lever, and when in engagement therewith the arm $k$ of the bell-crank lever is at such angle relative to the trip-lever that the latter is held on a "dead-line." This aids in holding the rake-head elevated. As soon as pressure is relieved from the trip-lever the rake-head is free to return to its normal lower position.

L is the retaining-lever, whereby the rake-teeth are held in a depressed or raised position by the pressure of the foot. This lever is arranged lengthwise over the draft-frame and consists of a rear arm $l$ and a front arm $l'$, carrying a treadle $l^2$. This front arm is preferably made telescopic, so that it can be operated by hand as well as by foot. A sliding section $l^3$ is connected to front arm $l'$ by keeper-plates $l^4$, and the treadle $l^2$ is connected direct to the outer end of said sliding section. The lever is pivoted or fulcrumed in a bifurcated support $l^5$, having an inclined extension $l^6$. A nutted bolt $l^7$ attaches the support firmly to one of the bars of the draft-frame, and the head thereof binds one end of a plate-spring $l^8$, which extends divergently over and above the extension $l^7$.

M is the rake-arm, which is rigidly attached to the vertical portion of the rake-head, and its upper end is bifurcated and provided with a series of coincident holes, through any two of which is passed a nutted bolt $m$ for pivotally attaching the rear end of a connecting-rod $m'$, the forward end of which latter is pivoted to the free end of the rear arm of the retaining-lever. This connecting-rod is composed of two telescopic sections $m^2$ $m^3$, each of which has a keeper-ring $m^4$, rigid with its end and forming the connection between the two sections. Stop-pins $m^4$ limit the movement of said sections. A coil-spring $m^5$ surrounds the two telescopic sections between the end rings, with which it contacts. This yielding connection between the rake-arm and the retaining-lever relieves all jar or strain in the lowering of the rake, and also permits the rake-teeth to swing forward without any undue strain in the event of said teeth contacting with any obstruction or elevation in the ground in the backing of the rake. (See dotted lines, Fig. 3.) The flat spring $l^8$ serves to normally hold the pivotal connections between the retaining-lever, the connecting-rod, and rake-arm out of a dead-line; but as soon as the tension of said spring is overcome by pressure on the treadle of the retaining-lever the parts will be firmly locked, the connections being on substantially a straight inflexible line. Then, too, in the lowering of the rake-head the spring $l^8$ receives the jar or weight of the retaining-lever. If the operator wishes to operate the retaining-lever by hand, it is necessary to only move outward the sliding section thereof.

N is a draft-equalizer capable of a swinging motion, alternating backward and forward between its securing-points by means of a flexible connection between said points. It comprises a bar $n$, located between the shafts and pivotally connected at its ends to two divergent short bars $n'$, which in turn are at their rear ends pivoted to clip-plates $n^2$, which are held between the draft-frame bar $a$ and the shafts by the eyebolts $b^{10}$, said clips having short hooks $n^3$, which fit in holes $n^4$ in said bars $n'$. In the event of any unevenness of draft on the draft-hooks $n^5$, which are pivoted to said bar $n$ at its ends, said bar will move forward at one end and rearward at the other, assuming substantially a straight line with one of the short bars $n'$. In this way the draft is thrown toward the sides of the rake and onto the tugs, allowing a compensating shoulder movement for the horse and decreasing the leverage from the center outward when either wheel comes in contact with any obstruction. Ordinarily when one wheel strikes against a stone or the like the pull is then exerted against the free wheel, throwing the draft sidewise against the point of pole or thills on one side of the rake; but by means of my improvement the instant one wheel meets an obstruction the end of the equalizer at that side of the rake will be thrown slightly forward and laterally and the other end rearward in like manner, forming, in conjunction with the singletree, substantially a rigid obtuse-angled triangle, thereby throwing the center of draft toward the side where the obstruction is encountered until the latter is passed or overcome. Hence the pull instead of being against the unobstructed wheel will be exerted directly against the side obstructed, all weight being thrown on the tug on the obstructed side. In other words, there will at first be a slight rearward pull on the tug on the side of the unobstructed wheel and all direct pull will be on the other side. The same result cannot be obtained by any other form of draft-equalizer heretofore known or used, since in all of them there is a direct and practically unlimited back-and-forth movement in a straight line with each trace, while with my equalizer the pull is necessarily exerted directly against the side on which is located the obstructed wheel.

O is the rider's seat, whose supporting-standards o are connected to the clearer-head and the draft-frame.

I claim as my invention—

1. In a horse hay-rake, the combination with the draft-frame and the carrying-wheels having short axles, of the clearer-head supported at its ends by said axles, the hinging-arms connected to said clearer-head having extensions provided with openings and recessed sides, the draft-frame having corresponding bars fitted in said recessed sides, the eyebolts binding said bars to said extension, the shafts connected by said eyebolts to said draft-frame, and the rake-head pivotally supported by said hinging-arms, substantially as set forth.

2. The combination with the carrying-wheels having short axles and inner ratchet-wheels, of throw-off plates mounted on said axles and having lower flanges, the clearer-head formed of a bar of L shape in cross-section, means for adjustably attaching the horizontal portions of said L-bar to said flanges, and the rake-head pivoted to said clearer-head and carrying pawls at its ends, as and for the purpose set forth.

3. The combination with the carrying-wheels having short axles and inner ratchet-wheels, of the throw-off plates pivotally mounted on said axles and having lower slotted flanges, the upper surfaces of which are serrated, the clearer-head having holes in its ends, nutted bolts for attaching said ends to said flanges of said plates, and serrated washers interposed between said flanges and said clearer-head and through which said nutted bolts are passed, and the pivoted rake-head carrying pawls, as and for the purpose set forth.

4. The combination with the carrying-wheels having ratchet-wheels secured thereto, of the pivoted rake-head formed of a bar L shape in cross-section, a spring-held trip-shaft mounted on the normally vertical portion of said bar, pawls on said shaft for engaging said ratchet-wheels, a trip-arm attached to said shaft and extended through a slot in the normally horizontal portion of said L-bar, and the trip-lever connected to said trip-arm beneath said L-bar, substantially as set forth.

5. The combination with the carrying-wheels having ratchet-wheels secured thereto, of the pivoted rake-head having a transverse slot therein, the trip-shaft mounted on said rake-head and having pawls on its ends, the trip-arm rigid on said trip-shaft and projected downward through said slot, the spring for normally holding said pawls out of engagement with said ratchet-wheels, and the trip-lever pivoted on the frame and connected to the lower end of said trip-arm beneath said rake-head, said slot limiting the movement of said trip-arm, substantially as set forth.

6. The combination with the draft-frame and the carrying-wheels having ratchet-wheels, of the pivoted rake-head, a trip-shaft thereon having pawls for engaging said ratchet-wheels, the throw-off plates, the trip-arm on said shaft, the trip-lever pivoted on said draft-frame and having a stop or stops for engaging said rake-head when the latter is elevated and the pawls have been disengaged from the ratchet-wheels, substantially as set forth.

7. The combination with the draft-frame and the carrying-wheels having ratchet-wheels, of the pivoted rake-head, the trip-shaft thereon having pawls for engaging said ratchet-wheels, the throw-off plates, the trip-arm on said shaft, the trip-lever pivoted on said draft-frame and having a yielding stop or stops for engaging said rake-head when the latter is elevated and the pawls have been disengaged from the ratchet-wheels, substantially as set forth.

8. The combination with the draft-frame and the carrying-wheels having ratchet-wheels, of the pivoted rake-head, the trip-shaft thereon having pawls for engaging said ratchet-wheels, the throw-off plates, the trip-arm on said shaft, the trip-lever pivoted on said draft-frame and having a pivoted arm provided with a series of shoulders, and a spring acting on said arm, substantially as and for the purpose set forth.

9. The combination with the draft-frame and the carrying-wheels having ratchet-wheels, of the rake-head having a slot therein, the trip-shaft, the pawls thereon, the trip-arm on said shaft extending through said slot, the trip-lever connected thereto, and the rock-shaft mounted on said draft-frame and on which said trip-lever is pivoted, as set forth.

10. The combination with the draft-frame, and the carrying-wheels having ratchet-wheels, of the rake-head having a slot therein, the trip-shaft, the pawls thereon, the trip-arm on said shaft extending through said slot, the trip-lever connected thereto, and the angular rock-shaft having its lower member mounted in said draft-frame and provided with an extension forming a stop for said trip-lever which is pivoted on said rock-shaft, substantially as set forth.

11. The combination with the draft-frame, of the pivoted rake-head, the rake-arm rigidly attached thereto, the retaining-lever pivoted upon the draft-frame and having an extensible or telescopic front arm provided with a side extension or treadle, whereby said lever is capable of being operated by hand or foot, and the extensible spring-held rod having a yielding connection with the rear end of said lever and said rake-arm, substantially as set forth.

12. The combination with the draft-frame, of a draft-equalizer consisting of a flexible bar having normally divergent ends secured to said frame, such securing-points being a less distance apart than the entire length of said bar, and draft-hooks secured to the said flexible bar near the ends thereof, as and for the purpose set forth.

13. The combination with the draft-frame, of a draft-equalizer consisting of one long member and two normally divergent end members loosely secured thereto, said end members being loosely attached at their free ends to said draft-frame at points a less distance apart than the entire length of said members, and draft-hooks secured to said members at the points of union of said divergent end members, substantially as set forth.

In testimony whereof I have signed this specification in the presence of two subscribing witnesses.

MARQUIS J. TODD.

Witnesses:
J. NOTA MCGILL,
WM. S. HODGES.